(12) United States Patent  (10) Patent No.: US 7,926,999 B2
Miyashita et al.  (45) Date of Patent: Apr. 19, 2011

(54) PLANAR LIGHT-EMITTING DEVICE AND DISPLAY APPARATUS HAVING THE SAME

(75) Inventors: Junji Miyashita, Fujiyoshida (JP); Takumi Miyashita, Fujikawaguchiko-machi (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 281 days.

(21) Appl. No.: 11/963,214

(22) Filed: Dec. 21, 2007

(65) Prior Publication Data

US 2008/0151575 A1 Jun. 26, 2008

(30) Foreign Application Priority Data

Dec. 26, 2006 (JP) ................................. 2006-349940

(51) Int. Cl.
*F21V 7/04* (2006.01)
(52) U.S. Cl. ....... 362/611; 362/615; 362/616; 362/97.1; 362/97.2; 362/97.3; 362/97.4
(58) Field of Classification Search .................. 362/611, 362/615, 616, 97.1–97.4
See application file for complete search history.

(56) References Cited

U.S. PATENT DOCUMENTS

| 7,014,347 | B2 | 3/2006 | Okuwaki |
| 7,128,459 | B2 * | 10/2006 | Igarashi et al. ............... 362/621 |
| 7,188,989 | B2 | 3/2007 | Miyashita |
| 7,309,154 | B2 * | 12/2007 | Ohkawa ......................... 362/615 |
| 2005/0180165 | A1 * | 8/2005 | Sado et al. ..................... 362/606 |
| 2006/0034579 | A1 * | 2/2006 | Sugiura .......................... 385/146 |

FOREIGN PATENT DOCUMENTS

JP 2004-265797 A 9/2004

* cited by examiner

*Primary Examiner* — Sandra L O Shea
*Assistant Examiner* — William J Carter
(74) *Attorney, Agent, or Firm* — Brinks Hofer Gilson & Lione

(57) ABSTRACT

A planar light-emitting device includes an elongate first light-guide plate (13) having a light entrance end surface (13a) disposed facing an exit surface (12a) of a light-emitting package (12), a reflecting side surface (13b) extending substantially at right angles to the light entrance end surface to reflect light entering through the light entrance end surface, and a light exit side surface (13c) facing the reflecting side surface, and a flat plate-shaped second lightguide plate (14) having a light entrance side edge surface (14a) facing the light exit side surface (13c). The first lightguide plate is configured to satisfy the condition of $t_1 < t_2 \leq t_3$, where: $t_1$, $t_2$ and $t_3$ are the respective heights of the light exit side surface (13c), the reflecting side surface (13b) and the light entrance end surface (13a). The surfaces of the first lightguide plate other than the light entrance end surface (13a) and the light exit side surface (13c) are reflecting surfaces.

9 Claims, 4 Drawing Sheets

[Fig. 1]
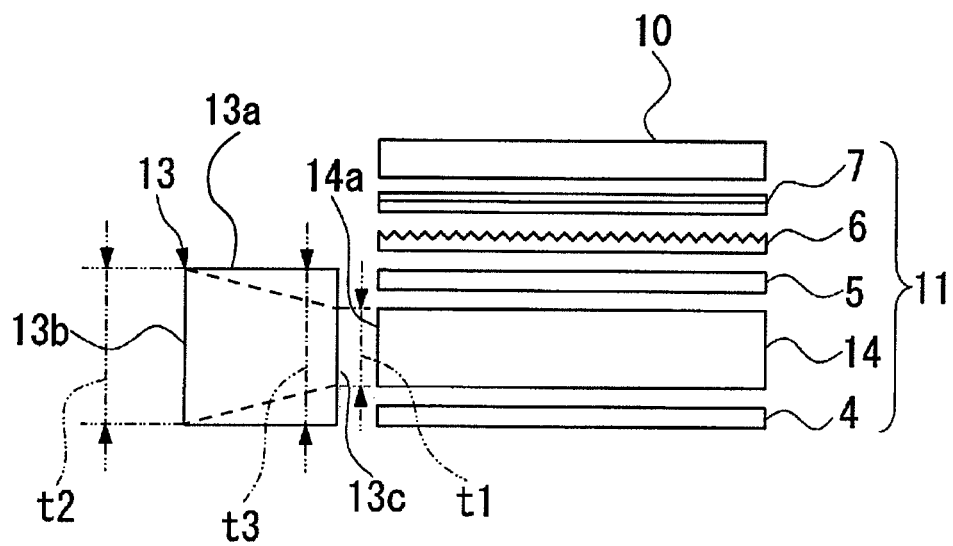
(a)
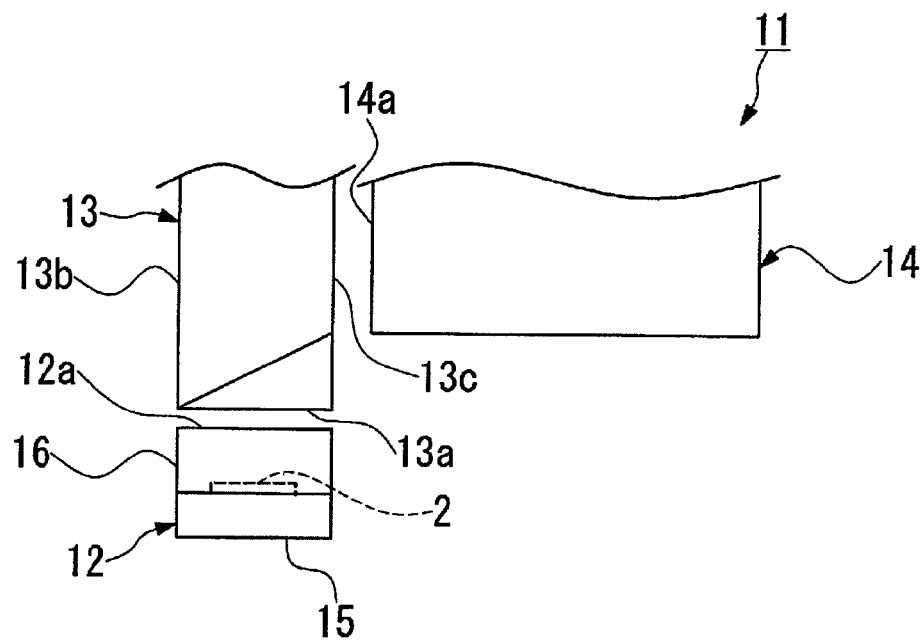
(b)

[Fig. 2]
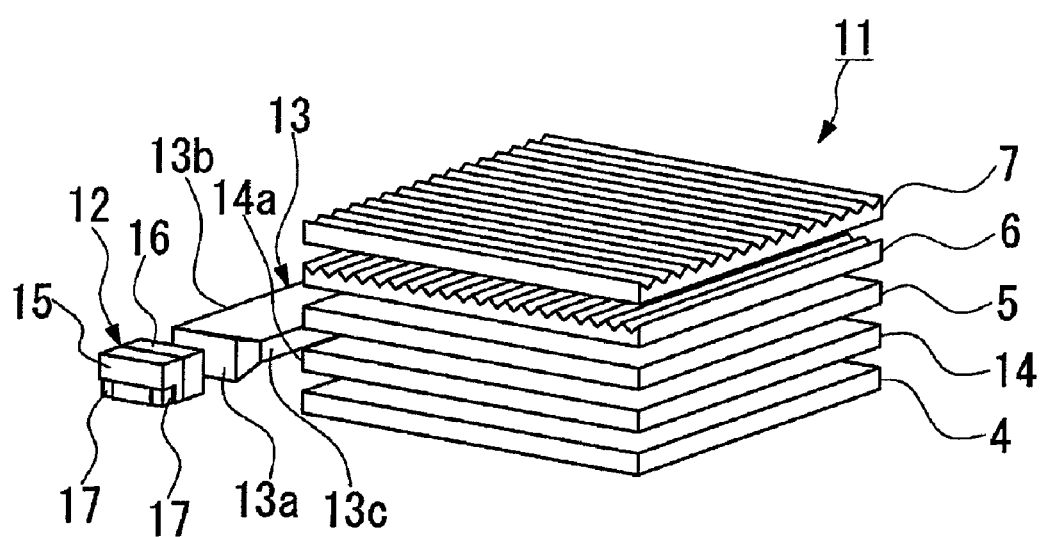

[Fig. 3]
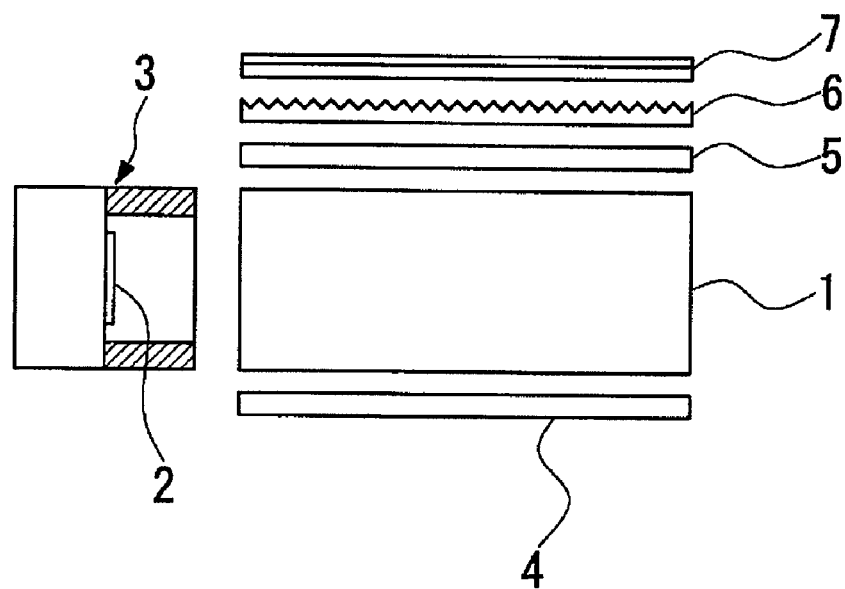

[Fig. 4]
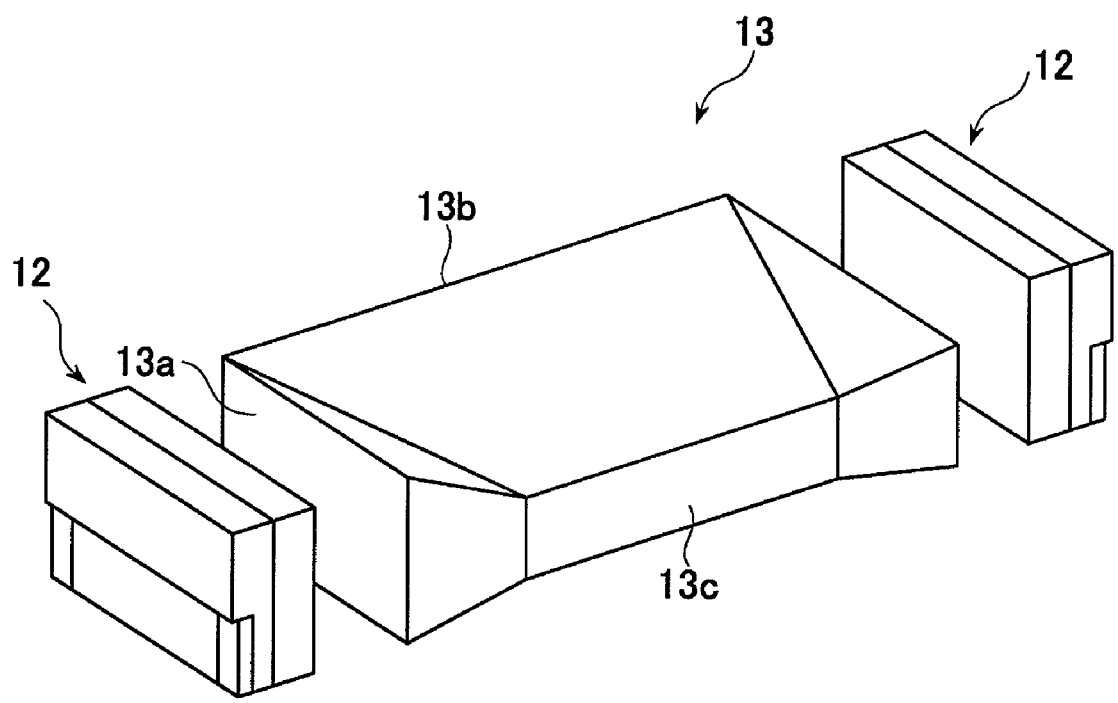

PLANAR LIGHT-EMITTING DEVICE AND DISPLAY APPARATUS HAVING THE SAME

This application claims priority under 35 U.S.C. §119 to Japanese Patent Application No. JP2006-349940 filed on Dec. 26, 2006, the entire contents of which are hereby incorporated by reference.

BACKGROUND

The present invention relates to a planar light-emitting device for use in liquid crystal displays of mobile phones and the like, for example, and also relates to a display apparatus having the planar light-emitting device.

RELATED CONVENTIONAL ART

Liquid crystal display apparatus for displaying letters or images have been widely used in displays of mobile phones, personal digital assistants (PDAs), etc. These liquid crystal display apparatus employ a backlight unit that applies illuminating light to a liquid crystal display panel from the back thereof to enhance the luminance of the display screen. A typical backlight unit is arranged as follows. As shown in FIG. 3, a light-emitting package 3 having a light-emitting element 2, for example, an LED light source, is installed adjacent to a side edge surface of a lightguide plate 1 so that light from the light-emitting package 3 enters the lightguide plate 1 through the side edge surface and exits from the upper surface of the lightguide plate 1. Reference numerals 4, 5, 6 and 7 in FIG. 3 denote a reflective sheet, a diffuser sheet, a first prism sheet and a second prism sheet, respectively.

With the achievement of thin and compact mobile phones, PDAs, etc., there has recently been a demand that backlight units and liquid crystal display apparatus be further reduced in thickness. In this regard, the above-described structure of the conventional backlight unit has the following problem. The height of the light entrance surface of the lightguide plate 1, i.e. the thickness of the lightguide plate 1, has to be set to match the height of the light exit surface of the light-emitting package 3. That is, the thickness of the lightguide plate 1 needs to be set equal to the height of the light-emitting package 3. Accordingly, reduction in thickness of the lightguide plate 1 is limited by the height of the light-emitting package 3. Thus, the backlight unit cannot be reduced in thickness as desired. If the light-emitting element 2 itself is reduced in size, the light-emitting package 3 becomes small, and thickness of the lightguide plate 1 can be reduced. In such a case, however, the amount of light emitted from the light-emitting element 2 reduces undesirably.

Meanwhile, Japanese Patent Application Publication No. 2004-265797, for example, proposes a planar light source device having a guide rod disposed facing a side edge surface of a lightguide plate and an LED light source disposed at an end of the guide rod. The end of the guide rod is increased in height in correspondence with the size of the LED light source. On the other hand, the light exit surface of the guide rod that faces the light entrance surface of the lightguide plate, i.e. the side edge surface, is reduced in height. In this planar light source device, light from the LED light source is made to enter the guide rod from the end thereof increased in height sufficiently in correspondence with the size of the LED light source, thereby allowing the light from the LED light source to be utilized without a loss. Meanwhile, the portion of the guide rod that faces the light entrance surface of the lightguide plate is reduced in thickness, thereby allowing a reduction in the overall thickness of the planar light source device.

In the above-described Japanese Patent Application Publication No. 2004-265797, the thickness of the guide rod is gradually reduced from the end toward the center thereof to minimize the loss of light from the light source. However, it is demanded that light from the light source should be guided to the light exit surface even more efficiently to further reduce the loss of light from the light source.

BRIEF SUMMARY

The present invention has been made in view of the above-described circumstances. Accordingly, an object of the present invention is to provide a planar light-emitting device capable of further suppressing the loss of light from a light source without reducing the light emission efficiency and also capable of being further reduced in thickness. Another object of the present invention is to provide a display apparatus having the above-described planar light-emitting device.

The present invention provides a planar light-emitting device including a light source, an elongate first lightguide plate, and a flat plate-shaped second lightguide plate. The light source emits light through an exit surface thereof. The first lightguide plate has a light entrance end surface disposed facing the exit surface of the light source, a reflecting side surface extending substantially at a right angle to the light entrance end surface to reflect light entering through the light entrance end surface, and a light exit side surface opposite the reflecting side surface. The second lightguide plate has a light entrance side edge surface disposed opposite to the light exit side surface of the first lightguide plate. The first lightguide plate is configured to satisfy the following condition:

$$t_1 < t_2 \leq t_3$$

where:
$t_1$ is the height of the light exit side surface;
$t_2$ is the height of the reflecting side surface; and
$t_3$ is the height of the light entrance end surface.

Further, surfaces of the elongate first lightguide plate other than the light entrance end surface and the light exit side surface are reflecting surfaces.

In the planar light-emitting device, the light entrance end surface of the first lightguide plate is high in height to match the exit surface of the light source, while the light exit side surface is lower in height than the light entrance end surface and the reflecting side surface. Accordingly, the second lightguide plate can be reduced in thickness without reducing the amount of light from the light source. Thus, it is possible to reduce the overall thickness of a backlight unit or a display apparatus that uses the planar light-emitting device.

Specifically, the first lightguide plate of the planar light-emitting device may be tapered such that its thickness gradually decreases from the reflecting side surface toward the light exit side surface and also gradually decreases from the light entrance end surface toward the light exit side surface. With this arrangement, the upper and lower reflecting surfaces between the reflecting side surface and the light exit side surface and those between the light entrance end surface and the light exit side surface become tapered surfaces sloping toward the light exit side surface. Accordingly, the first lightguide plate can efficiently narrow the light and guide it to the light exit side surface.

In addition, the present invention provides a display apparatus including an image display panel and the above-described planar light-emitting device of the present invention disposed at the back of the image display panel as a backlight unit. That is, the display apparatus adopts as a backlight unit the planar light-emitting device of the present invention reduced in thickness and capable of suppressing the loss of light. Therefore, it is possible to reduce the overall thickness of the apparatus and to realize image display of high luminance.

The display apparatus of the present invention is characterized in that the image display panel is a liquid crystal display panel. That is, the display apparatus is a liquid crystal display apparatus using a liquid crystal display panel. Therefore, it is possible to further reduce the thickness of the apparatus and also to achieve weight and cost reduction.

In addition, the present invention provides an elongate lightguide plate having a light entrance end surface, a reflecting side surface extending substantially at a right angle to the light entrance end surface to reflect light entering through the light entrance end surface, and a light exit side surface opposite the reflecting side surface. The lightguide plate is configured to satisfy the following condition:

$$t_1 < t_2 \leq t_3$$

where:
$t_1$ is the height of the light exit side surface;
$t_2$ is the height of the reflecting side surface; and
$t_3$ is the height of the light entrance end surface.

Specifically, the lightguide plate may be tapered such that its thickness gradually decreases from the reflecting side surface toward the light exit side surface and also gradually decreases from the light entrance end surface toward the light exit side surface.

BRIEF DESCRIPTION OF THE DRAWINGS

FIG. 1a is a schematic view showing a display apparatus according to the present invention.

FIG. 1b is a fragmentary plan view showing the positional relationship between a light-emitting package and first and second lightguide plates in the display apparatus shown in FIG. 1a.

FIG. 2 is a perspective view of the display apparatus in FIG. 1a, showing the relationship between a backlight unit and the light-emitting package.

FIG. 3 is a partly-sectioned side view showing a backlight unit according to a related conventional art.

FIG. 4 is a perspective view showing a modification of the first lightguide plate in the present invention.

DETAILED DESCRIPTION OF THE PREFERRED EMBODIMENTS

One embodiment of a planar light-emitting device and display apparatus having the same according to the present invention will be described below with reference to FIGS. 1a to 2.

The display apparatus in this embodiment is, as shown in FIGS. 1a, 1b and 2, a liquid crystal display apparatus applicable, for example, to liquid crystal displays of mobile phones and PDAs. The display apparatus has a liquid crystal display panel (image display panel) 10 and a backlight unit (planar light-emitting device) 11 disposed at the back of the liquid crystal display panel 10.

The backlight unit 11 in this embodiment has a light-emitting package (light source) 12, an elongate first lightguide plate 13, a flat plate-shaped second lightguide plate 14, a diffuser sheet 5, a combination of a first prism sheet 6 and a second prism sheet 7, and a reflective sheet 4. The light-emitting package 12 emits light from light-emitting elements 2 through an exit surface 12a thereof. The first lightguide plate 13 has a light entrance end surface 13a disposed facing and in close proximity to the exit surface 12a of the light-emitting package 12, a reflecting side surface 13b extending substantially at right angles to the light entrance end surface 13a to reflect light entering through the light entrance end surface 13a, and a light exit side surface 13c facing the reflecting side surface 13b. The second lightguide plate 14 has a light entrance side edge surface 14a facing adjacent to the light exit side surface 13c of the first lightguide plate 13. The diffuser sheet 5 is disposed directly above the second lightguide plate 14 to diffuse light from the second lightguide plate 14, thereby making uniform the in-plane light intensity distribution. The first prism sheet 6 and the second prism sheet 7 are stacked directly above the diffuser sheet 5 to emit light from the diffuser sheet 5 upward toward the liquid crystal display panel 10. The reflective sheet 4 is disposed underneath the second lightguide plate 14.

The light-emitting package 12 emits white light, for example, and has the above-described light-emitting elements 2, a substantially rectangular parallelepiped package substrate 15 mounting the light-emitting elements 2, a transparent resin 16 that seals the light-emitting elements 2 on the package substrate 15, and reflecting surfaces (not shown) formed over the peripheral surfaces of the transparent resin 16 except the forward end surface of the transparent resin part 16, which is the exit surface 12a.

The light-emitting elements 2 are surface-mount type LED elements mounted on the mount surface of the package substrate 15 at a predetermined distance therebetween. Each LED element is, for example, a blue (wavelength λ: 470 to 490 nm) LED element or an ultraviolet (wavelength λ: less than 470 nm) LED element, which is formed, for example, by stacking a plurality of semiconductor layers of a gallium nitride compound semiconductor (e.g. InGaN compound semiconductor) on an insulating substrate, e.g. a sapphire substrate.

The transparent resin 16 that seals the light-emitting elements 2 is, for example, a transparent resin containing a fluorescent substance, which is formed by adding, for example, YAG fluorescent substance into a silicone resin as a main component. The YAG fluorescent substance converts blue or ultraviolet light from the light-emitting elements 2 into yellow light, and white light is produced by color mixing effect. Accordingly, the light-emitting elements 2 and the transparent resin 16 in combination constitute a white LED light source. It should be noted that various light-emitting elements and transparent resins in addition to those described above are usable as the components of the white LED light source comprising the light-emitting elements 2 and the transparent resin 16.

The package substrate 15 is formed from a glass epoxy resin, for example. The package substrate 15 has a pair of terminal patterns 17 disposed on the opposite ends thereof. The terminal patterns 17 are terminals electrically connected to the light-emitting elements 2.

The reflecting surfaces of the light-emitting package 12 may be formed from a regular reflection member of a white or silver resin bonded to the transparent resin 16 or a metal film having a light-reflecting function that is formed on the transparent resin 16 by vapor deposition.

That is, in the light-emitting package 12, light emitted from the light-emitting elements 2 is reflected by the reflecting surfaces formed over the entire transparent resin 16 except the exit surface 12a and allowed to exit from the exit surface 12a.

The first lightguide plate 13 is configured so that the surfaces thereof have respective heights set to satisfy the following condition:

$t_1 < t_2 \leq t_3$ where:
$t_1$ is the height of the light exit side surface 13c;
$t_2$ is the height of the reflecting side surface 13b; and
$t_3$ is the height of the light entrance end surface 13a.

The first lightguide plate 13 is tapered such that its thickness gradually decreases from the reflecting side surface 13b toward the light exit side surface 13c and also gradually decreases from the light entrance end surface 13a toward the light exit side surface 13c. That is, in the first lightguide plate 13, the upper and lower reflecting surfaces between the reflecting side surface 13b and the light exit side surface 13c are tapered surfaces sloping so that the distance therebetween gradually narrows toward the light exit side surface 13c. Similarly, the upper and lower reflecting surfaces between the light entrance end surface 13a and the light exit side surface 13c are tapered surfaces sloping so that the distance therebetween gradually narrows toward the light exit side surface 13c.

Further, to form light-reflecting surfaces, the first lightguide plate 13 has prisms or other reflecting members (not shown) disposed on the surfaces thereof other than the light entrance end surface 13a and the light exit side surface 13c. Examples of the reflecting members are prisms, white or silver resin or metal reflecting members bonded to the surfaces, and metal films having a light-reflecting function that are formed on the surfaces by vapor deposition.

The first lightguide plate 13 and the second lightguide plate 14 are formed from a transparent polycarbonate or acrylic resin, for example.

The first prism sheet 6 and the second prism sheet 7 are transparent sheet-shaped members that collect light from the diffuser sheet 5 and direct it upward. The first prism sheet 6 and the second prism sheet 7 have on their upper sides a plurality of prisms having parallel ridges. The first prism sheet 6 is set so that the ridges of its prisms are at a predetermined angle to the optical axis (direction perpendicular to the light exit side surface 13c) of the first lightguide plate 13 in plan view. To obtain high directivity in the upward direction, in particular, the first prism sheet 6 is set so that the prism ridges extend in a direction perpendicularly intersecting the optical axis of the first lightguide plate 13 in plan view. The second prism sheet 7 is set so that its prism ridges are parallel to the optical axis of the first lightguide plate 13. In other words, the first prism sheet 6 and the second prism sheet 7 are disposed so that the ridges of their prisms are orthogonal to each other in plan view.

The reflective sheet 4 is formed from a metal sheet, film or foil having a light-reflecting function. In this embodiment, a film provided with an evaporated silver layer is used as the reflective sheet 4. It should be noted that an evaporated aluminum layer or the like may be used in place of the evaporated silver layer.

The reflective sheet 4 is to be mounted and bonded onto a flexible substrate (not shown).

The liquid crystal display panel 10 is a transmissive or semitransmissive liquid crystal display panel. In the case of a semitransmissive liquid crystal display panel 10, for example, it has a panel body having a liquid crystal material, e.g. TN liquid crystal or STN liquid crystal, sealed with a sealant in a gap between an upper substrate and a lower substrate, each having a transparent electrode, an alignment film and a polarizer. The semitransmissive liquid crystal display panel 10 further has a semitransmitting-reflecting sheet having both light-transmitting and light-reflecting functions, which is disposed underneath the panel body.

Thus, in the backlight unit 11 and the display apparatus having the same in this embodiment, the first lightguide plate 13 is configured so that the surfaces thereof have respective heights set to satisfy the condition of $t_1 < t_2 \leq t_3$, where: $t_1$, $t_2$ and $t_3$ are the respective heights of the light exit side surface 13c, the reflecting side surface 13b and the light entrance end surface 13a. Further, the surfaces of the first lightguide plate 13 other than the light entrance end surface 13a and the light exit side surface 13c are reflecting surfaces. Therefore, light entering the first lightguide plate 13 can be allowed to efficiently exit therefrom and enter the thinner second lightguide plate 14. That is, the light entrance end surface 13a of the first lightguide plate 13 is high in height to match the exit surface 12a of the light-emitting package 12, while the light exit side surface 13c is lower in height than the light entrance end surface 13a and the reflecting side surface 13b. In addition, the peripheral surfaces of the first lightguide plate 13 other than the light entrance end surface 13a and the light exit side surface 13c are reflecting surfaces. Therefore, light reflected and guided by the reflecting surfaces can be allowed to efficiently exit from the thinner light exit side surface 13c and enter the second lightguide plate 14 having a thickness corresponding to the light exit side surface 13c of the first lightguide plate 13. Accordingly, the second lightguide plate 14 can be reduced in thickness without reducing the amount of light from the light-emitting package 12. Thus, it is possible to reduce the overall thickness of the apparatus.

Further, the first lightguide plate 13 is tapered such that its thickness gradually decreases from the reflecting side surface 13b toward the light exit side surface 13c and also gradually decreases from the light entrance end surface 13a toward the light exit side surface 13c. Accordingly, the upper and lower reflecting surfaces between the reflecting side surface 13b and the light exit side surface 13c and those between the light entrance end surface 13a and the light exit side surface 13c can efficiently narrow light and guide it to the light exit side surface 13c. Adopting the above-described tapered configuration enables light to be reflected at each reflecting surface so as to satisfy the condition for the critical angle at the light exit side surface 13c. Particularly, if a reflecting member comprising prisms or dots, for example, is disposed on the reflecting side surface 13b, it is possible to reflect light by the reflecting member and to change the travel direction of light by the reflecting surface so as to satisfy the condition for the critical angle at the light exit side surface 13c, thereby enabling a larger amount of light to exit from the light exit side surface 13c.

Thus, providing the first lightguide plate 13 between the light-emitting package 12 and the thin second lightguide plate 14 enables the latter two to be combined together without being restricted by the size of the light-emitting package 12. Accordingly, it is possible to realize an unprecedented thin backlight unit 11.

Because the liquid crystal display apparatus employs the backlight unit 11 reduced in thickness and capable of suppressing the loss of light, it is possible to reduce the overall thickness of the apparatus and to realize image display of high luminance.

It should be noted that the present invention is not necessarily limited to the foregoing embodiment but can be modified in a variety of ways without departing from the scope of the present invention.

For example, although in the foregoing embodiment the light-emitting package 12 is disposed only at one end of the first lightguide plate 13 and the light entrance end surface 13a is disposed at one end of the first lightguide plate 13 in association with the light-emitting package 12, the arrangement may be as shown in FIG. 4. That is, two light-emitting packages 12 may be respectively disposed at both ends of the first lightguide plate 13, and two light entrance end surfaces 13a may be respectively disposed at both ends of the first lightguide plate 13. In this case, light enters the first lightguide plate 13 from both ends thereof. Therefore, a higher luminance can be obtained.

Although the diffuser sheet 5 is used in the foregoing embodiment, the backlight unit may omit the diffuser sheet 5.

Although in the foregoing embodiment the liquid crystal display panel 10 is employed as the image display panel, other types of image display panels may be used, for example, an electronic paper.

What is claimed is:

1. A planar light-emitting device comprising:
    two light sources each having a light-emitting surface to emit light;
    an elongated first lightguide plate comprising an upper surface, a lower surface opposite to the upper surface, and peripheral side surfaces between the upper and lower surfaces, the peripheral side surfaces including two opposite light entrance end surfaces each facing the light-emitting surface of the corresponding light source, the elongated first lightguide plate further comprising a light exit side surface to emit light transmitted through the first lightguide and a reflecting side surface, the light exit side surface and the reflecting side surface being opposite to each other;
    wherein:
    $t_1$ is a height of the light exit side surface of the first lightguide;
    $t_2$ is a height of the reflecting side surface of the first lightguide;
    $t_3$ is a height of the two opposite light entrance end surfaces of the first lightguide, wherein the $t_3$ height is configured to at least match each of the light-emitting surfaces of the light sources;
    wherein the first lightguide plate is configured to satisfy the following condition: $t_1 < t_2 \leq t_3$; and
    further wherein the first lightguide plate is tapered with its thickness gradually decreased from the reflecting side surface toward the light exit side surface that is opposite to the reflecting surface, and the first lightguide is further tapered with its thickness gradually decreased from each of the two opposite light entrance end surfaces toward the light exit side surface,
    further comprising a flat plate-shaped second lightguide plate having a light entrance side edge surface that is disposed to face the light exit side surface of the first lightguide plate.

2. A display apparatus comprising:
    an image display panel; and
    the planar light-emitting device of claim 1 disposed at a back of the image display panel as a backlight unit.

3. The display apparatus of claim 2, wherein the image display panel is a liquid crystal display panel.

4. The planar light-emitting device of claim 1, wherein the two light sources have two light-emitting packages.

5. The planar light-emitting device of claim 4, wherein each of the light-emitting diode packages includes at least one light-emitting diode element.

6. The planar light-emitting device of claim 1, wherein the light source comprises a light-emitting diode package including at least one light-emitting diode element.

7. The planar light-emitting device of claim 1, wherein the upper and lower surfaces of the elongate first lightguide plate are reflecting surfaces.

8. An elongated lightguide plate comprising:
    an upper surface, a lower surface opposite to the upper surface, peripheral side surfaces between the upper and lower surfaces, a light exit side surface to emit light transmitted through the elongated lightguide plate, and a reflecting side surface, wherein the peripheral side surfaces include two opposite light entrance end surfaces each being disposed to face a light source, and further wherein the light exit side surface and the reflecting side surface are opposite to each other;
    wherein:
    $t_1$ is a height of the light exit side surface of the elongated lightguide plate;
    $t_2$ is a height of the reflecting side surface of the elongated lightguide plate; and
    $t_3$ is a height of the two opposite light entrance end surfaces of the elongated lightguide plate, wherein $t_3$ is sufficient in height to at least match the light sources,
    further wherein the elongated lightguide plate is tapered with its thickness gradually decreased from the reflecting side surface toward the light exit side surface that is opposite to the reflecting surface, and the first lightguide is further tapered with its thickness gradually decreased from each of the two opposite light entrance end surfaces toward the light exit side surface.

9. The elongated lightguide plate of claim 8, wherein the upper and lower surfaces are reflecting surfaces.

* * * * *